United States Patent

Brown

[15] 3,659,198
[45] Apr. 25, 1972

[54] MEANS FOR CHECKING THE RELATIVE NOISE LEVELS OF TRANSISTORS

[72] Inventor: Robert L. Brown, 1125 Gard Place, Loveland, Colo. 80537

[22] Filed: Jan. 8, 1971

[21] Appl. No.: 104,868

[52] U.S. Cl. ........................................324/158 T, 324/57 N
[51] Int. Cl. ..................................G01r 31/26, G01r 27/00
[58] Field of Search.............324/158 D, 158 T, 158 R, 57 N

[56] References Cited

UNITED STATES PATENTS 2,935,684   5/1960   Lanning ........................324/158 T
3,535,635  10/1970   Okumura .......................324/158 T Primary Examiner—Rudolph V. Rolinec
Assistant Examiner—Ernest F. Karlsen
Attorney—R. H. Galbreath

[57] ABSTRACT

The transistors to be checked and compared are individually and sequentially inserted into a test transistor socket which connects each successive transistor into a noise test circuit provided with a potentiometer. The potentiometer is adjusted to set each successive transistor to a reference D.C. state. The noise level is then picked up at the collector lead of the socket and is amplified and recorded on a meter. Comparison of the recorded noise level with the noise level of reference transistors, measured in the same manner, provides a quick, simple and reliable check of the transistors.

7 Claims, 2 Drawing Figures

PATENTED APR 25 1972 3,659,198
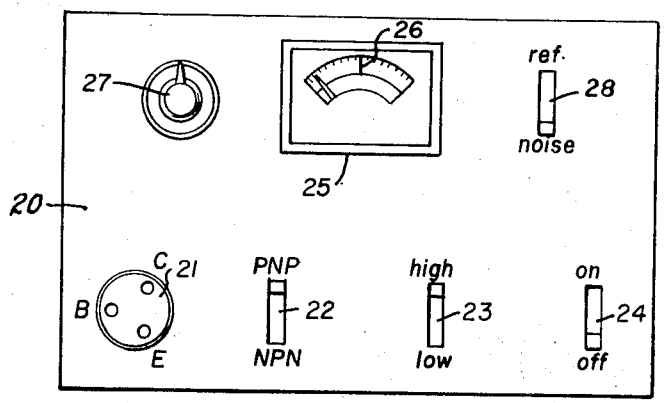
Fig. 1
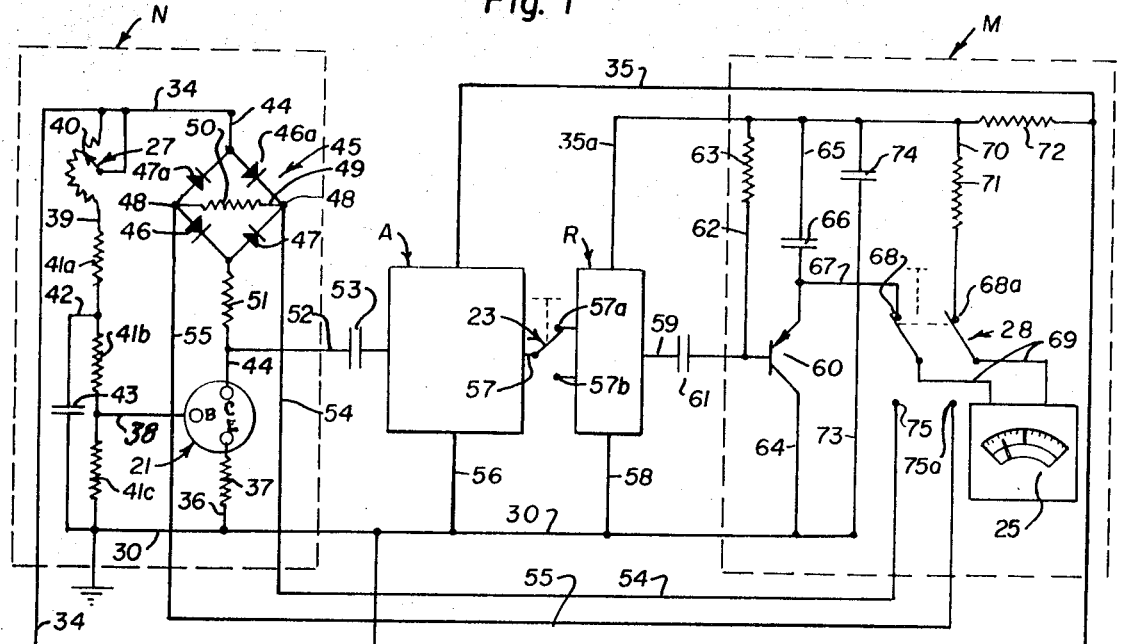
Fig. 2
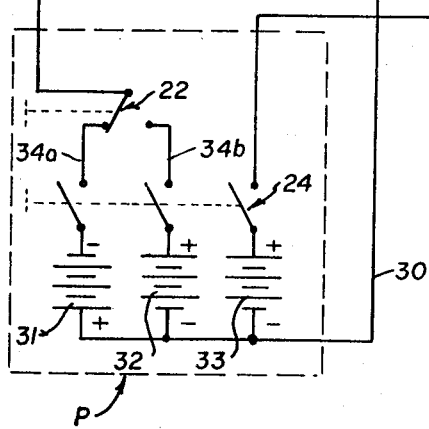
INVENTOR
Robert L. Brown
BY
ATTORNEY

MEANS FOR CHECKING THE RELATIVE NOISE LEVELS OF TRANSISTORS

The present invention relates to the measurement of the noise level in transistors, and more particularly to apparatus for measuring the noise level in a transistor by comparison of the same with the noise level in a reference transistor. As such, the invention may be called a transistor noise level indicator.

Noise in transistors is caused by a number of factors including an inherent characteristic noise level in each transistor. Also, additional noise can be caused by heat, high voltage, loose or defective junctions, bad connections and other factors. Regardless of the cause, an excessively high noise level can render a transistor undesirable especially when receiving low level signals to be amplified. Such low level signals are often encountered in the use of transistorized communication equipment and it is therefore desirable to use transistors having a noise level as low as possible to prevent objectionable interference with the signals being amplified by the equipment.

The best known transistor noise testers are comparatively elaborate laboratory type units designed to test a transistor at selected frequencies to check its condition at the frequency range of its contemplated use. Other transistor noise testers are designed to give more technical information such as a noise factor and noise current under a variable band width in which the noise is measured. There is, however, a need for a transistor noise tester of a simple, easily portable type which is more suited for on-the-job testing. The present invention, a transistor noise level indicator, was conceived and developed with such a need in view and comprises, in essence, a small, compact device wherein a transistor is adjusted to a selected reference state, the noise is then picked up, amplified and recorded, all as hereinafter set forth. The absolute noise level relative to the output of the transistor is not measured but instead, it is compared with the noise level of another transistor which is, preferably, a reference transistor of high quality.

The present invention arose out of the discovery that the noise generated in a transistor responsive to a direct current through the transistor is indicative of the noise which would be generated in a transistor by an input over a broad range of frequencies. The noise signals, per se, will be picked up as voltages at various frequencies, and in the present invention, the aggregate of all noise voltages between the frequencies of 20 Hz and 100,000 Hz are measured in one lump sum and not at different frequency intervals as in conventional noise testers. It was found that this approach for testing the transistors was fully reliable to indicate a defective transistor.

It follows that the principal object of the invention is to provide a novel and improved transistor noise level indicator which is a simple, self-contained, portable unit especially suitable as a trouble-shooting apparatus for finding higher than normal noise levels in the transistors of electronic equipment.

Another object of the invention is to provide a novel and improved transistor noise level indicator which is capable of quickly and accurately testing transistors by simple sequences of operation wherein the results are evaluated by a direct comparison with selected indicator transistors.

Other objects and advantages reside in the detailed construction of the invention, which combines circuits and components thereof in a simple, economical and efficient manner, all of which will become more apparent from the following description. In the following detailed description of the invention, reference is made to the accompanying drawing which forms a part hereof. Like numerals refer to like parts in all views of the drawing and throughout the description.

In the drawing:

FIG. 1 is a face view of an instrument panel of a container which may be used for holding the circuits which constitute the improved noise level indicator; and FIG. 2 is a schematic circuit diagram of a preferred embodiment of the improved transistor noise level indicator.

Referring more particularly to the drawing, the transistor noise level indicator is basically an array of electrical circuits and components therefor, which may be housed in a comparatively small box, having one face 20 forming an instrument panel as shown at FIG. 1. The controls and components on this instrument panel 20 include: a transistor-test socket 21, having receptacles to receive the three conventional leads of a transistor; a polarity switch 22, to shift the polarity of the circuits so as to accommodate either PNP or NPN transistors in the socket; a range switch 23 for testing a high noise level or a low noise level and a control switch 24 to turn the entire apparatus on and off.

Once a transistor is placed into the socket 21 and the aforementioned switches are properly set, the signals required for a test will be read on a meter 25, which is a galvanometer having suitable scale markings to indicate deflection of its needles including a selected mark 26 for a reference test since the meter will be used to establish both the reference noise level and the test noise level. In association therewith, a resistor reference adjustment dial 27 is provided to set the galvanometer and a shift switch 28 is provided to shift circuits when reference adjustments are to be made.

After the transistor to be tested is inserted into the test socket 21 and the several switches are properly set, the shift switch 28 is set to establish the desired reference current and is then shifted to indicate the noise level as will be described. To complete the instrument panel, markings are provided on the race of the panel to indicate the proper placement of the transistor leads and to identify the several switches and their proper settings for a test as shown in FIG. 1.

The circuit diagram at FIG. 2 includes the above described components at their proper locations in the circuit arrangement. The circuit may be described as five component groups of circuits; a power supply P, a noise pickup N, an amplifier A, a range selector R and a meter circuit M. These several sub-circuits are interconnected by leads, couplers and switches as hereinafter described. The power supply P, the noise pickup N and the meter circuit M are indicated by broken line blocks with the circuit leads and components shown within them, while the amplifier A and the range selector R are shown as solid line blocks without circuit detail within them since they are conventional.

In order to use a small container for the apparatus, the power supply P uses dry cell batteries, preferably mercury batteries of a suitable voltage level. Each battery is connected to a common ground lead 30 which extends to the other component groups of circuits. A first battery 31 is provided to drive a PNP transistor and has its positive terminal connected to the ground lead 30. A second battery 32 is provided to drive an NPN transistor and has its negative terminal connected to the ground lead 30. A third battery 33 is provided to drive the amplifier circuit A, the range selector R and the meter circuit M. This battery 33 has its negative terminal connected to the ground lead 30. The negative terminal of the battery 31, the positive terminal of battery 32 and the positive terminal of battery 33 are connected to the control, off-on, switch 24. The switch 24 is a single-throw, three-pole switch so that the three batteries are thrown into the circuit simultaneously whenever it is desired to turn the tester on. Short stub leads 34a and 34b extend from the respective contacts of switch 24 which connect batteries 31 and 32 into the circuits and these leads terminate at the contacts of the PNP - NPN switch 22. The switch 22 is a single-pole, double-throw switch so that it may close with either the lead 34a or the lead 34b. A power lead 34 extends from the pole contact of switch 22 and to the noise pickup N. To complete the circuits from the power supply, a power lead 35 extends from a contact of the switch 24 to the meter M and thence to the amplifier A and the range selector R as in the manner hereinafter described.

The noise pickup N includes the test socket 21 which will receive the leads of a transistor which is to be tested. The emitter contact thereof connects to ground 30 by a lead 36. A resistor 37 in lead 36 controls the current between the ground and the emitter. The base of the transistor socket connects through a lead 38 to a voltage divider lead 39. The lead 39 is connected directly between the power lead 34 and the ground lead 30. A sequence of resistors in the voltage divider lead 39 include a variable resistor 40 which connects with a shunted adjusting arm which is controlled by the reference adjustment dial 27. The other resistors 41a, 41b and 41c in the divider 39 are selected to provide a suitable bias on the base lead 38 with the base lead being interposed between resistors 41b and 41c. A decoupler lead 42 shunts resistors 41b and 41c and the lead 42 includes a capacitor 43 which functions as a decoupling capacitor to prevent unwanted noise signals from extending to the base contact of the socket.

A collector lead 44 extends from the collector contact of the test socket 21 to bifurcate and form a pair of arms of a current diverter 45. A diode 46 is provided in the left-hand arm and an oppositely directed diode 47 is provided in the righthand arm. The arms reach to opposing lefthand and righthand contact points 48 and then converge together to continue as lead 44 which connects with power lead 34. The converging lefthand arm includes a diode 47a directed the same as diode 47 in the diverging righthand lead, and the converging righthand lead includes a diode 46a directed the same as diode 46 in the diverging lefthand lead. The opposing contacts 48 are interconnected by a transverse lead 49 having a resistor 50 therein. A second resistor 51 is provided in the lead 44 to function as a load resistor.

Other leads from the noise pickup N include a noise pickup lead 52 from the collector lead 44, at a point adjacent to the transistor, and to the amplifier A. This lead 52 includes a coupling capacitor 53 to prevent any direct current flow to pass through the lead 52 and into the amplifier. To complete the circuits from the noise pickup N, leads 54 and 55 extend from the contacts 48 to the meter circuit M and are provided for test purposes as hereinafter described.

The operation of the noise pickup N to impose a noise signal on lead 52 may now be described. Whenever a PNP transistor is placed in the socket 21, the switch 24 is closed and the switch 22 is shifted to the PNP lead 34a as illustrated. A voltage is imposed on transistor base lead 38 which is adjusted to a selected value by dial 27 of variable resistor 40 as will be hereinafter explained. The direct current voltage on lead 38 is cleared of any noise or extraneous signal by the coupling capacitor 43. This bias voltage on the lead 38 will cause current flow from the ground 30 through lead 36, thence through the transistor being tested, thence through the collector lead 44, through the diode 47, across the transverse lead 49, thence through the diode 47a and to the power lead 34. Whenever an NPN transistor is to be tested, the same procedure is to be followed excepting the switch 22 is shifted to the NPN lead 34b. This reverses the voltage differential upon the emitter lead 36, the base lead 38 and the collector lead 44. The result is substantially the same, excepting that the current will flow through the diodes 46 and 46a instead of the diodes 47 and 47a heretofore described, to impose a current through the transverse lead 49 which is in the same direction as in the test with the PNP transistor.

The amplifier A is not shown in detail since it is conventional. It is to be noted, however, that this amplifier is arranged as a broad band type wherein it will amplify signals between the frequency of 20 Hz and 100,000 Hz, the frequency range wherein most noise signals are to be found. This amplifier is powered by the power lead 35 and the circuits therein are completed by a lead 56 connecting to the ground lead 30.

All transistors have a certain amount of noise, a factor inherent in the generation of electrical current itself and in the structure of the unit. However, it becomes desirable to record this noise as in the manner hereinafter described, at either a low range or a high range of response and the range selector R receives the signals from the amplifier to further amplify the noise signals at two selected levels. The range switch 23, a double-throw, single-pole switch, is interposed in a lead 57 between the amplifier and the range selector to connect the signals from the amplifier to the range selector R through either a high range input lead 57a or a low range input lead 57b. The range selector is connected to a power lead 35a, which, in turn, connects with lead 35, and to ground by a ground lead 58.

The noise signal output from the range selector R extends through a lead 59, to the meter circuit M and therein to the base of a transistor 60. A coupling capacitor 61 is interposed in the lead 59 and a lead 62 having a resistor 63 connects the base lead 59 with the power input lead 35a to impose a proper bias on the transistor base. The collector of the latter transistor is connected to ground by a lead 64 while the emitter connects with the power lead 35a by a lead 65 which includes a filter capacitor 66. The emitter lead 65 also connects with the power lead 35a through the meter 25. A branch lead 67 extends from the emitter lead 65 and connects with a terminal 68 of the shift switch 28. The switch 28 is a double-pole, double-throw switch. A lead 69 loops from the poles of the switch 28 and through the meter 25 and, whenever one pole is on terminal 68, the other pole is on a terminal 68a as illustrated. A lead 70 from the terminal 68a connects with the power supply lead 35a; thus, whenever the poles of switch 28 close on the terminals 68 and 68a, the circuit through the meter is completed. A calibration resistor 71 is provided in lead 70 and a resistor 72 is provided in the lead 35a connecting with the power lead 35. The power lead 35a is shunted to ground 30 by a lead 73 having a capacitor 74 therein which will decouple any A. C. signal and assure a substantially uniformly directed flow of current through the meter.

To complete this arrangement, the other contacts 75 and 75a of the shift switch 28 connect with leads 54 and 55 which extend from the two opposing contact points 48 of the current diverter 45 as heretofore described.

The operation of the apparatus may now be described further. Whenever a transistor is placed in the test socket 21 and the polarity switch 22 is set to the proper lead 34a or 34b to agree with the type of transistor being tested, a flow of current through the collector lead 44 imposes a voltage drop between the two contacts 48 of the current diverter 45. This voltage drop is used to set the meter 25. The poles of the switch 28 are closed on contacts 75 and 75a and the reference adjustment 27 of resistor 40 is shifted until the arm of the meter is at the reference scale mark 26. Thereafter, the poles of switch 28 are shifted to terminal 68 and 68a for the noise test. The deflection of the meter blade will be indicative of the amplified noise as picked up by lead 52, and the extent of deflection will determine whether switch 23 will have to be shifted to the high range or to the low range of the range selector R. This deflection of the meter will then be compared with the deflection when a reference transistor is placed in the socket 21 and tested in precisely the same manner.

I have now described by invention in considerable detail. However, it is obvious that others skilled in the art can build and devise alternate and equivalent constructions which are nevertheless within the spirit and scope of my invention. Hence, I desire that my protection be limited not by the constructions illustrated and described, but only by the proper scope of the appended claims.

Having thus described the invention what is claimed and desired to be secured by Letters Patent is:

1. Apparatus for measuring the noise level of a transistor to be checked comprising:

a. a socket to receive and connect with the leads of the transistor;
   b. a means for imposing a selected current upon the transistor and producing a noise signal at the collector thereof wherein said means for imposing a selected current upon the transistor comprises, a voltage source, a voltage divider means across the voltage source, a base lead from the base of the transistor tapping the voltage divider means, a variable resistance in the voltage divider means to impose a selected voltage upon the base of the transistor, a by-pass lead shunting the voltage divider means and a capacitor in the latter lead to bypass voltage fluctuations emanating from the voltage source, and collector and emitter leads from the transistor to the aforesaid voltage source;
c. a means for receiving and amplifying the noise signal;
d. a means for converting the amplified noise signal into direct current; and
e. a meter having meter leads connected to the converting means.

2. Apparatus as described in claim 1 having:
a. means for establishing a selected current flow through the collector lead of the transistor responsive to the voltage applied to the base lead.

3. Apparatus as described in claim 2 in which the means for establishing the selected current flow through the collector lead of the transistor comprises:
a. a resistor in the collector lead; and
b. means including leads to establish a selected voltage drop across the latter resistor.

4. Apparatus as described in claim 3 in which the means to establish the voltage drop comprises:
a. a double throw switch in the aforesaid meter leads adapted to connect the signal converting means at one throw position and to connect the voltage-drop-indicating leads at the other throw position.

5. Apparatus as described in claim 1 having:
a. means to reverse the polarity of the voltage source.

6. In the apparatus defined in claim 3, wherein the socket may selectively receive either a PNP transistor or an NPN transistor, wherein a means is provided to reverse the polarity of the voltage source to the current divider and to the transistor leads and wherein said means to establish the current flow through the collector lead includes:
a. a resistor in the collector lead, with contact points at each side thereof;
b. a voltage drop indicating means across said contact points; and
c. a current divider means in the collector lead at each side of the resistor adapted to maintain current flow through the resistor in a given direction regardless of the change of polarity of the voltage source.

7. Apparatus as defined in claim 6 wherein said diverter means comprises:
a. a bifurcation of the collector lead to the said two contact points with a diode in each bifurcation branch thereof and with each diode being directed oppositely to the other; and
b. a collector lead branch from each of said contact points to the voltage source with a diode in each branch, with each diode being directed oppositely to the other diode and also being directed oppositely to the diode in the aforesaid bifurcation branch connecting with the same contact point.

* * * * *